US 9,537,850 B2

(12) United States Patent
Kanno

(10) Patent No.: US 9,537,850 B2
(45) Date of Patent: Jan. 3, 2017

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Asuka Kanno, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 190 days.

(21) Appl. No.: 14/338,139

(22) Filed: Jul. 22, 2014

(65) Prior Publication Data
US 2015/0046987 A1    Feb. 12, 2015

(30) Foreign Application Priority Data
Aug. 12, 2013   (JP) .................. 2013-167849

(51) Int. Cl.
*H04L 29/06* (2006.01)
*H04L 29/08* (2006.01)

(52) U.S. Cl.
CPC .............. *H04L 63/08* (2013.01); *H04L 67/02* (2013.01)

(58) Field of Classification Search
CPC .................. H04L 63/08; H04L 67/02
See application file for complete search history.

(56) References Cited

U.S. PATENT DOCUMENTS

2010/0017889 A1* 1/2010 Newstadt ............... H04L 63/20
                                                                    726/28
2013/0212665 A1* 8/2013 Goyal .................... G06F 21/41
                                                                    726/8

FOREIGN PATENT DOCUMENTS

JP              4913227             1/2012

* cited by examiner

*Primary Examiner* — Jeffrey Pwu
*Assistant Examiner* — Thong Truong
(74) *Attorney, Agent, or Firm* — Fitzpatrick, Cella, Harper & Scinto

(57) ABSTRACT

An information processing apparatus includes a storage unit capable of storing authentication information corresponding to a web service. Information is output in a web page corresponding to a first web service so as to cause a display unit to display, via a web browser, an indicator to receive an instruction to delete the authentication information stored in the storage unit. Upon receiving the instruction by the output indicator, deletion processing of authentication information corresponding to a second web service different from the first web service is executed in the storage unit.

24 Claims, 7 Drawing Sheets

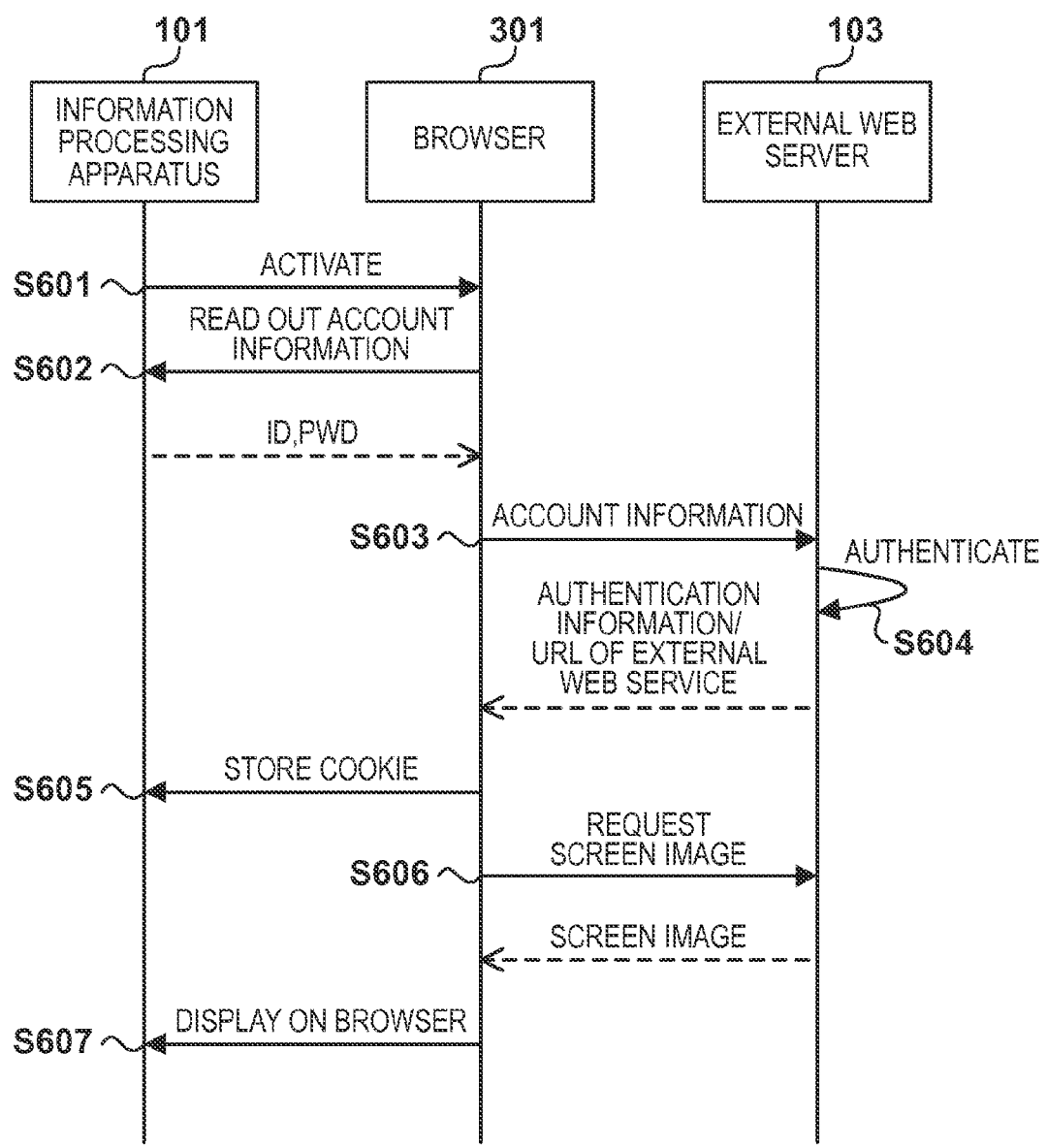

INFORMATION PROCESSING APPARATUS, INFORMATION PROCESSING METHOD, AND STORAGE MEDIUM

BACKGROUND OF THE INVENTION

Field of the Invention

The present invention relates to an authentication information management technique.

Description of the Related Art

There exist web services (to be referred to as target web services hereinafter) on a web, which provide various functions of, for example, storing user's photos and making them open. In such a target web service handling private information, authentication processing of individual users is executed. Additionally, in a browser, it is a common practice to store user's authentication information in a file.

There also exist external web services which cooperate with the target web services and provide different functions. An external web service, for example, receives photo data from a target web service and processes the photo data, creates an album or calendar using the photo data, or prints the processing result.

A method is known in which the external web service performs authentication processing of a target web service to be used before access to user's data, and causes a browser to store authentication information (to be referred to as a Cookie hereinafter), thereby accessing user's data on the target web service. For such an external web service, a target web service that separately provides an authentication function for the external web service exists.

In a case where a plurality of users use a browser, however, there is a problem of security. That is, if a file storing a Cookie remains, users other than a user who has performed authentication can also access the user's data. Japanese Patent No. 4913227 describes a method of deleting a Cookie on the OS side when a user has terminated a browser.

In the technique described in Japanese Patent No. 4913227, however, when, for example, user switching is done, and processing is continued without terminating a browser, the Cookie cannot be deleted. Hence, to delete the Cookie at a user's desired timing, the user executes an operation of manually deleting the Cookie. However, the Cookie deletion method changes depending on the browser, and the user needs skill in browser operation.

A target web service sometimes has no authentication information deletion function even when an authentication function for an external web service is prepared. Furthermore, a web service may have a security restriction in a browser so the Cookie of another domain cannot be deleted. Hence, the Cookie of a target web service cannot be deleted from the side of an external web service.

The present invention has been made in consideration of the above-described problems, and makes it possible to easily execute deletion of stored authentication information.

SUMMARY OF THE INVENTION

According to one aspect of the present invention, there is provided an information processing apparatus comprising: a storage unit capable of storing authentication information corresponding to a web service; an output unit configured to output information in a web page corresponding to a first web service so as to cause a display unit to display, via a web browser, an indicator to receive an instruction to delete the authentication information stored in the storage unit; and a deletion unit configured to, upon receiving the instruction by the indicator output by the output unit, execute, in the storage unit, deletion processing of authentication information corresponding to a second web service different from the first web service.

Further features of the present invention will become apparent from the following description of exemplary embodiments with reference to the attached drawings.

BRIEF DESCRIPTION OF THE DRAWINGS

FIG. 6 is a sequence chart showing the procedure of processing at the time of browser activation;

DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

It should be noted that the following embodiments are not intended to limit the scope of the present invention, and that not all the combinations of features described in the embodiments are necessarily essential to the solving scheme of the present invention.

<<First Embodiment>>

(System Arrangement)

Figure 1:
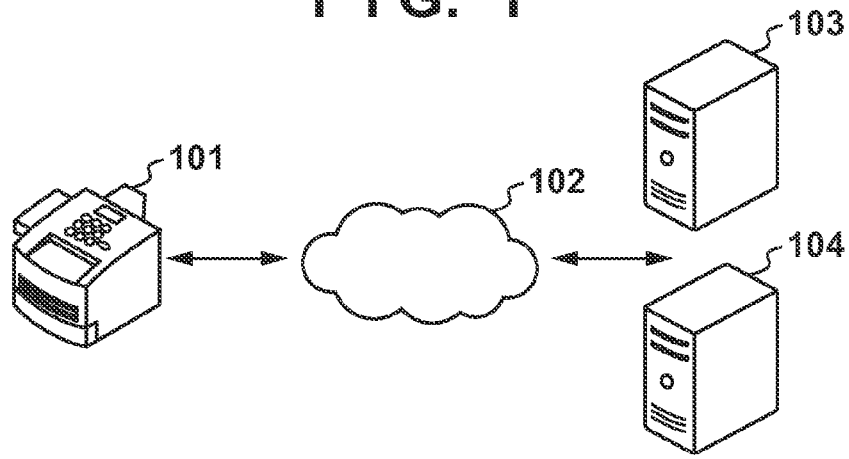
FIG. 1 is a view showing an example of a system arrangement.

FIG. 1 is a view showing an example of a system arrangement including a network according to this embodiment. The system shown in FIG. 1 includes an information processing apparatus 101 and web servers 103 and 104. The information processing apparatus 101 is connected to the Internet 102, and uses web services provided by the web servers 103 and 104 via the Internet 102. Note that to use a web service, login using account information registered in advance for each web service is required. Note that login here indicates general account information input, authentication processing in a server, and authentication information acquisition.

The account information of a web service (to be referred to as a target web service hereinafter) provided by the web server 104 (to be referred to as a target web server hereinafter) changes between users. That is, authentication processing for a target web service is authentication processing for a user. When a plurality of users use one information processing apparatus, authentication is executed for each of the plurality of users.

On the other hand, a web service (to be referred to as an external web service hereinafter) provided by the web server 103 (to be referred to as an external web server hereinafter) requires account information registration for each information processing apparatus 101. Here, an information processing apparatus is usable by a plurality of users, but even when the information processing apparatus is identified, identification of each user is not necessarily required. That is, authentication processing for an external web service is authentication processing for an information processing apparatus but not for a user. The external web service logs in to the above-described target web service using authentication information for the target web service, thereby providing the functions of the target web service or a service using the information of the login user to the information processing apparatus 101.

Although FIG. 1 illustrates the information processing apparatus 101 as a multifunction peripheral, it may be an information terminal such as a general PC (Personal Computer), smartphone, or tablet.

(Arrangement of Information Processing Apparatus)

Figure 2:
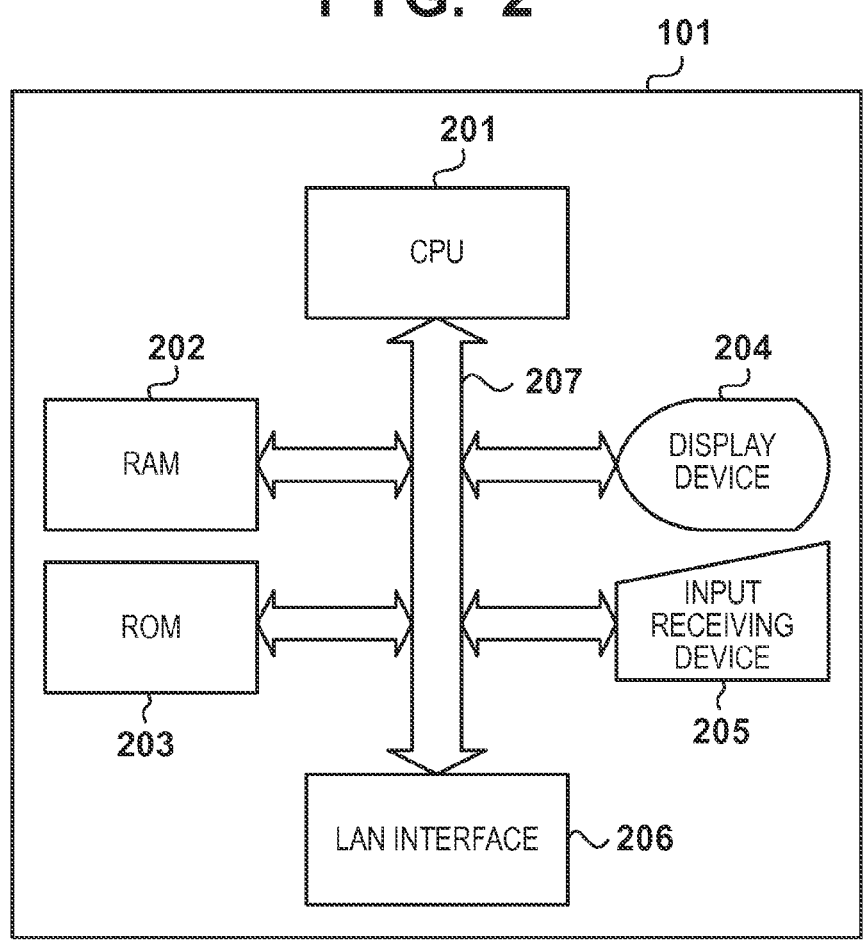
FIG. 2 is a block diagram showing an example of the hardware arrangement of an information processing apparatus.

FIG. 2 is a block diagram showing an example of the hardware arrangement of the information processing apparatus 101. For example, as shown in FIG. 2, the information processing apparatus 101 includes a CPU 201, a RAM 202, a ROM 203, a display device 204, an input receiving device 205, a LAN interface 206, and a system bus 207.

The CPU 201 executes determination and control complying with data calculation or an instruction in accordance with programs stored in the RAM 202 or the ROM 203. The RAM 202 is a storage unit serving as a temporary storage area when the CPU 201 performs various kinds of processing, for example, a memory capable of storing authentication information and the like. The ROM 203 is a storage unit that records the operating system (OS), a browser, and other application software.

The display device 204 is formed from, for example, a liquid crystal display and a graphic controller, and displays a web page downloaded from a server or an image such as a graphical user interface (GUI). Note that the display device 204 may be a device that is different from the information processing apparatus 101 and is externally attached to the information processing apparatus 101. In this case, the information processing apparatus 101 is configured to externally output information to be displayed by the information processing apparatus 101.

The input receiving device 205 is a device configured to receive a user operation and give various kinds of instructions to the information processing apparatus 101, and is formed from, for example, hardware keys. The input receiving device 205 may also be a device that is different from the information processing apparatus 101 and is externally attached to the information processing apparatus 101. In this case, the information processing apparatus 101 is configured to have an external input terminal to receive input from the input receiving device 205. The information processing apparatus 101 performs various kinds of control corresponding to various kinds of user instructions received by the input receiving device 205. Note that FIG. 2 illustrates the display device 204 and the input receiving device 205 separately. However, a touch panel display that integrates the display device 204 and the input receiving device 205 may be used.

The LAN interface 206 is an interface connected to a LAN cable. Data communication with the external web server 103 or the target web server 104 is performed via the LAN interface 206, a router (not shown), and the Internet 102. Note that this data communication may wirelessly be performed using, for example, an interface supporting wireless communication. In this case, the LAN interface can be, for example, a wireless LAN interface. The system bus 207 exchanges data between the CPU 201, the RAM 202, the ROM 203, and the like.

Figure 3:
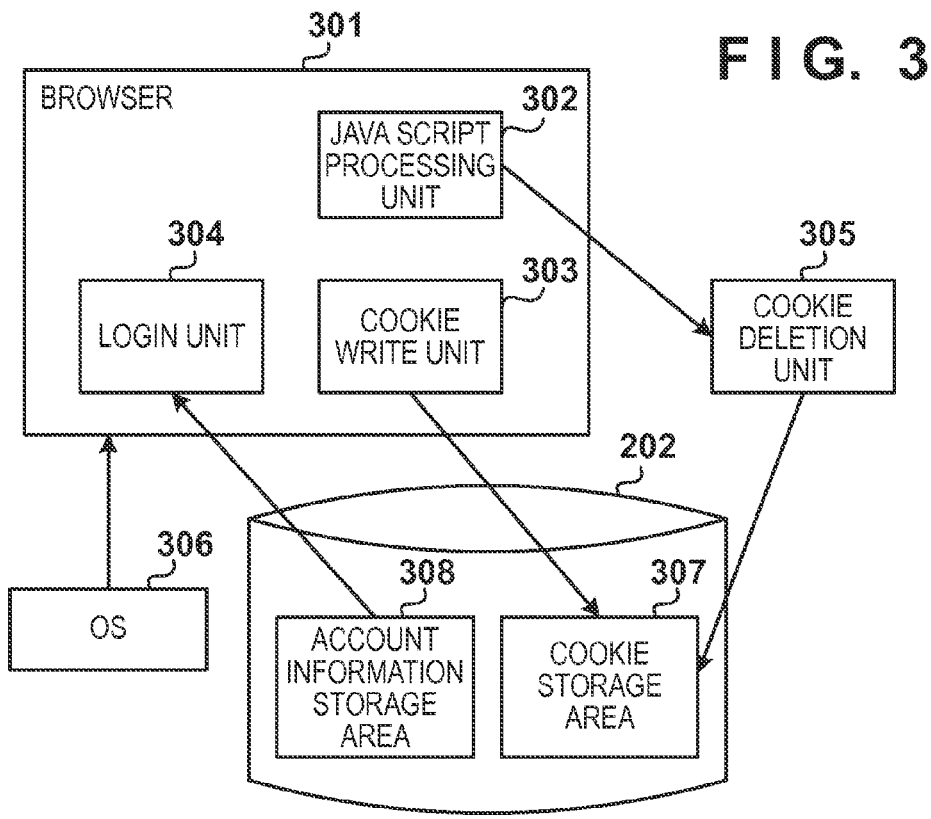
FIG. 3 is a block diagram showing an example of the software configuration of the information processing apparatus according to the first embodiment.

FIG. 3 is a block diagram showing an example of the software configuration of the information processing apparatus 101. Programs to be run and their data processing configurations will be described below. Note that the programs shown in FIG. 3 are stored in, for example, the ROM 203 shown in FIG. 2 and executed by the CPU 201 using the RAM 202 as a temporary storage area.

A browser 301 is an application configured to display a web page held by an external web service or a target web service. The web page is downloaded to the RAM 202 and displayed on the display device 204 via the browser 301. The web page is a structured document described in HTML® or XHTML including Java Script®.

Java Script is executed by a Java Script processing unit 302. The browser 301 is activated from an OS 306. A Cookie write unit 303 writes a Cookie received from the external web server 103 or target web server 104 in a Cookie storage area 307 on the RAM 202. A login unit 304 transmits, for example, account information including an ID and a password, which are necessary to use the external web service and are read out from an account information storage area 308 on the RAM 202, to the external web service, and logs in to the external web service. In this embodiment, the account information of the external web service is a combination of an ID and a password. However, the account information may be a combination of a mail address, a telephone number, a nickname, and the like.

A Cookie deletion unit 305 is plugin software invoked from a web page displayed on the browser 301, and, for example, deletes all Cookies stored in the Cookie storage area 307. Note that the Cookie deletion unit 305 is here assumed to be a plugin program for the browser 301. However, it may be incorporated from the beginning as a function of the browser 301 itself.

(Operation of System)

The processes of the information processing apparatus 101 and various servers according to this embodiment will be described next with reference to FIGS. 4 and 6 to 8. Note that, for example, programs corresponding to the processes of the information processing apparatus 101 and various servers shown in FIGS. 4 and 6 to 8 are stored in the ROM 203 or the memories of the servers and executed by the CPU 201 or the processors of the servers, thereby implementing the processes shown in FIGS. 4 and 6 to 8.

Figure 4:
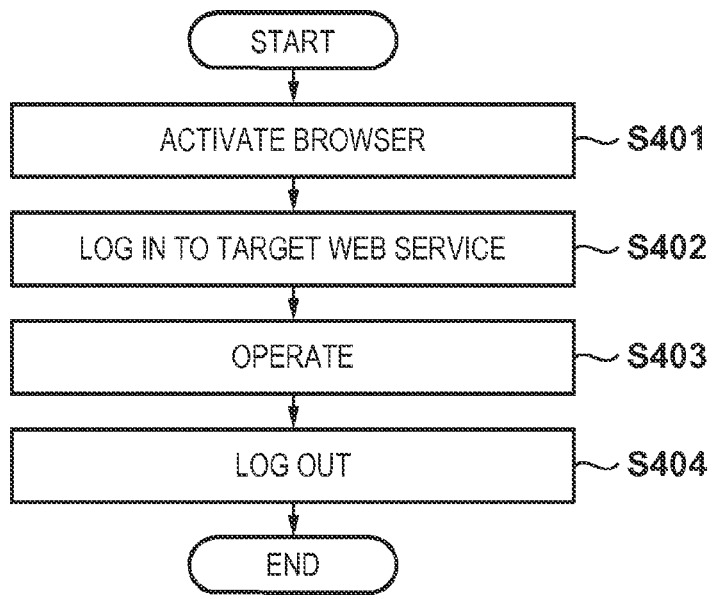
FIG. 4 is a flowchart showing the procedure of processing to be executed by the information processing apparatus when using an external web service.
Figure 5C:
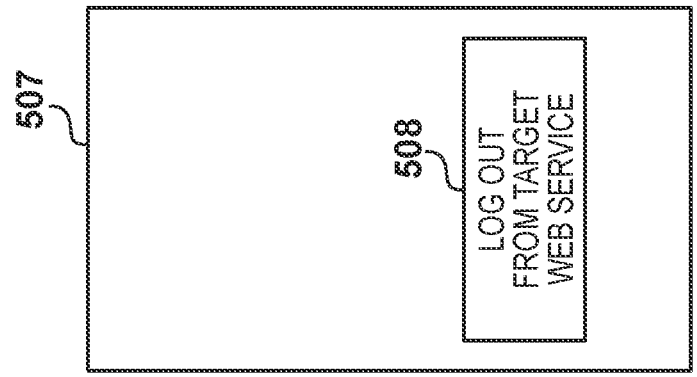
FIGS. 5A to 5C are views showing examples of screen images to be displayed when the information processing apparatus uses an external web service.
Figure 5B:
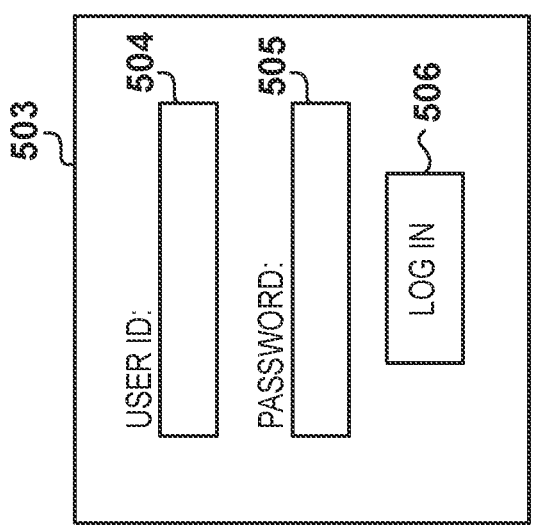
Figure 5A:
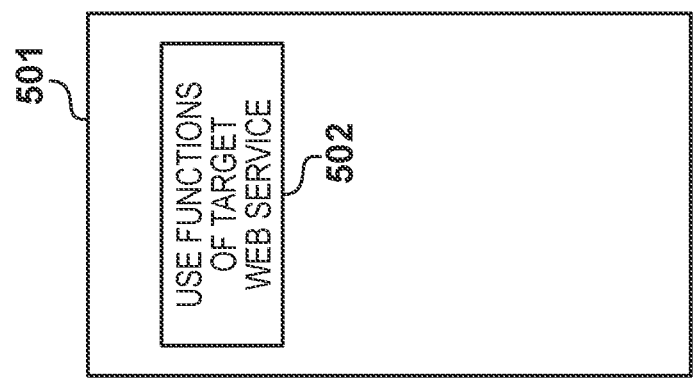

FIG. 4 illustrates the procedure of processing to be executed by the information processing apparatus 101 when using an external web service according to this embodiment. FIGS. 5A to 5C show examples of screen images to be displayed at that time. When using the external web service, the information processing apparatus 101 executes processing in the order of browser activation (step S401), login to a target web service (step S402), operation (step S403), a logout (step S404). These processes will be explained below.

In browser activation (step S401), the user activates the browser 301 and logs in to the external web service. FIG. 6 is a sequence chart showing the procedure of processing of step S401. FIG. 5A shows the web page of the external service displayed after activation of the browser 301.

Referring to FIG. 6, for example, when the browser 301 receives an activation instruction from the input receiving device 205 (step S601), the login unit 304 reads out the account information of the external web service from the account information storage area 308 (step S602). Note that at this time, the user may be prompted to input the account information (for example, ID and password) via, for example, the display device 204. After that, the browser 301 transmits the readout account information to the external web service (step S603). The external web server 103 performs authentication using the received account information (step S604), and returns response data including authentication information (Cookie) and the URL of the external web service. The browser 301 causes the Cookie write unit 303 to store the received Cookie in the Cookie storage area 307 (step S605). The browser 301 accesses the received web page URL of the external service to request a screen image (step S606), and displays a received web page 501 of the external service on the display device 204 (step S607). At this time, as shown in FIG. 5A, the web page 501 includes an image to receive an instruction to use the functions of the target web service.

Figure 7:
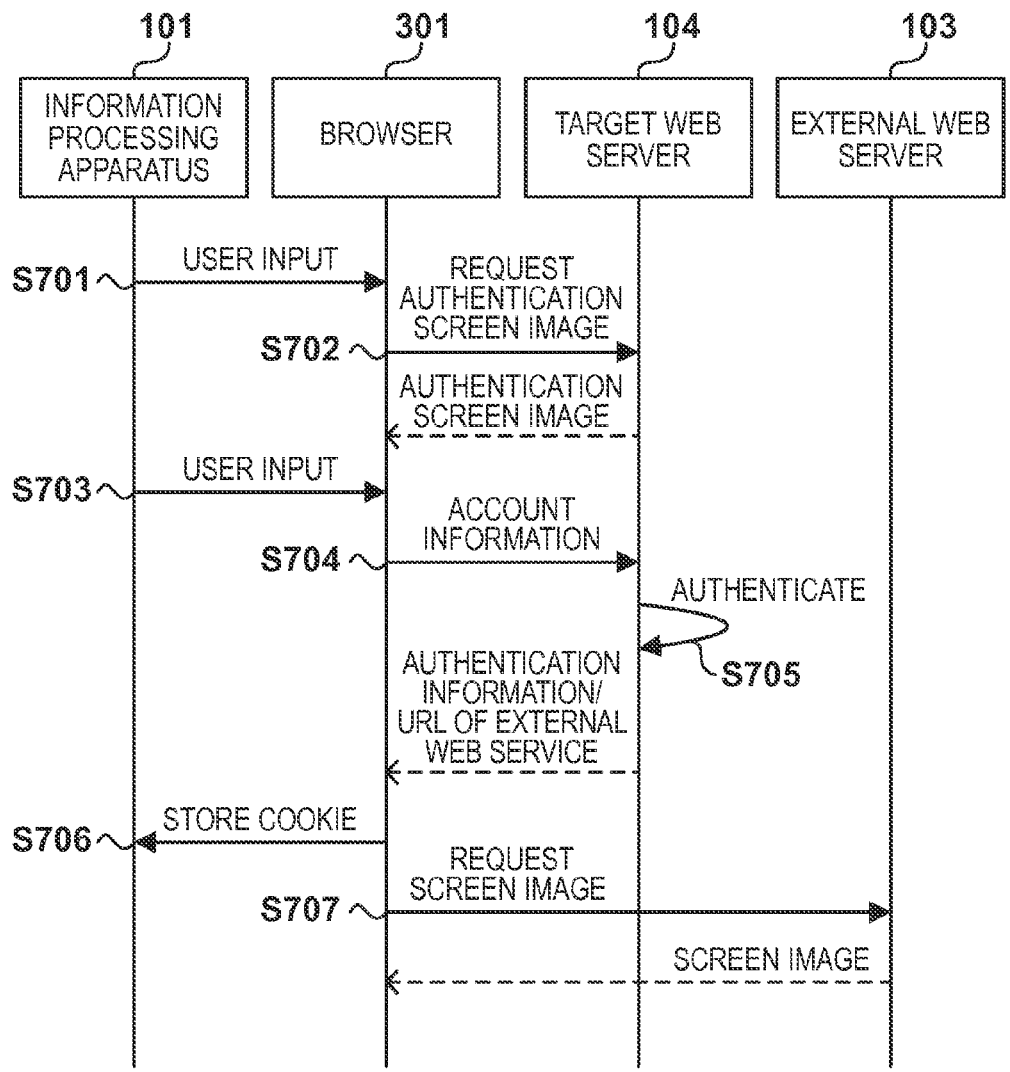
FIG. 7 is a sequence chart showing the procedure of login processing to a target web service.

In login to the target web service (step S402) of FIG. 4, the information processing apparatus logs in from the web page of the external web service to the target web service. FIG. 7 is a sequence chart showing the procedure of processing of step S402. FIG. 5C shows an example of the screen image of the external web service after target web service authentication.

Referring to FIG. 7, when the user designates a portion 502, shown in FIG. 5A, of the screen image provided by the external web server 103, the browser 301 receives a target web service use request (step S701). The browser 301 then requests the target web server 104 to send an authentication screen image with the URL of the external web service, and acquires and displays the authentication screen image of the target web service (step S702). Various methods are usable to authentication in the target web server 104. A typical authentication method using OAuth authentication by redirect will be described here. Note that a method different from the OAuth authentication method may be used as the authentication method of the target web service.

FIG. 5B shows an example of a target web service authentication screen image. An authentication screen image 503 is a screen image to receive, from the user, account information necessary to use the target web service. In this case, the account information includes a user ID and a password. However, required account information may change between services.

Assume that the user inputs his/her account information to a user ID input area 504 and a password input area 505 and presses a login button 506. The browser 301 thus acquires the account information of the user (step S703), and transmits the account information to the target web server 104 (step S704). The target web server 104 executes authentication processing based on the received account information, and returns the received URL of the external web service as redirect parameters together with a Cookie (step S705). In the browser 301, the Cookie write unit 303 stores the received Cookie in the Cookie storage area 307 (step S706). The browser 301 requests a screen image of the received URL of the external web service and displays a received web page 507 (step S707). At this time, the web page 507 may include an indicator 508 (for example, image) to receive an instruction to log out from the target web service, as shown in FIG. 5C.

In operation (step S403) of FIG. 4, the user displays and operates a web page of the external web service using data of the target web service. After that, when the operation ends, logout (step S404) is executed.

As is common in a web application, an application may be provided with an authentication function for an external web service but not with a logout function (authentication information deletion function). Hence, conventionally, to do logout, the user deletes the Cookie by a manual browser operation. However, the Cookie deletion method changes depending on the browser, and the user needs skill in browser operation. Furthermore, a web service may be incapable of deleting a Cookie of another domain, and the external web service may be incapable of deleting the Cookie of the target web service.

Figure 8:
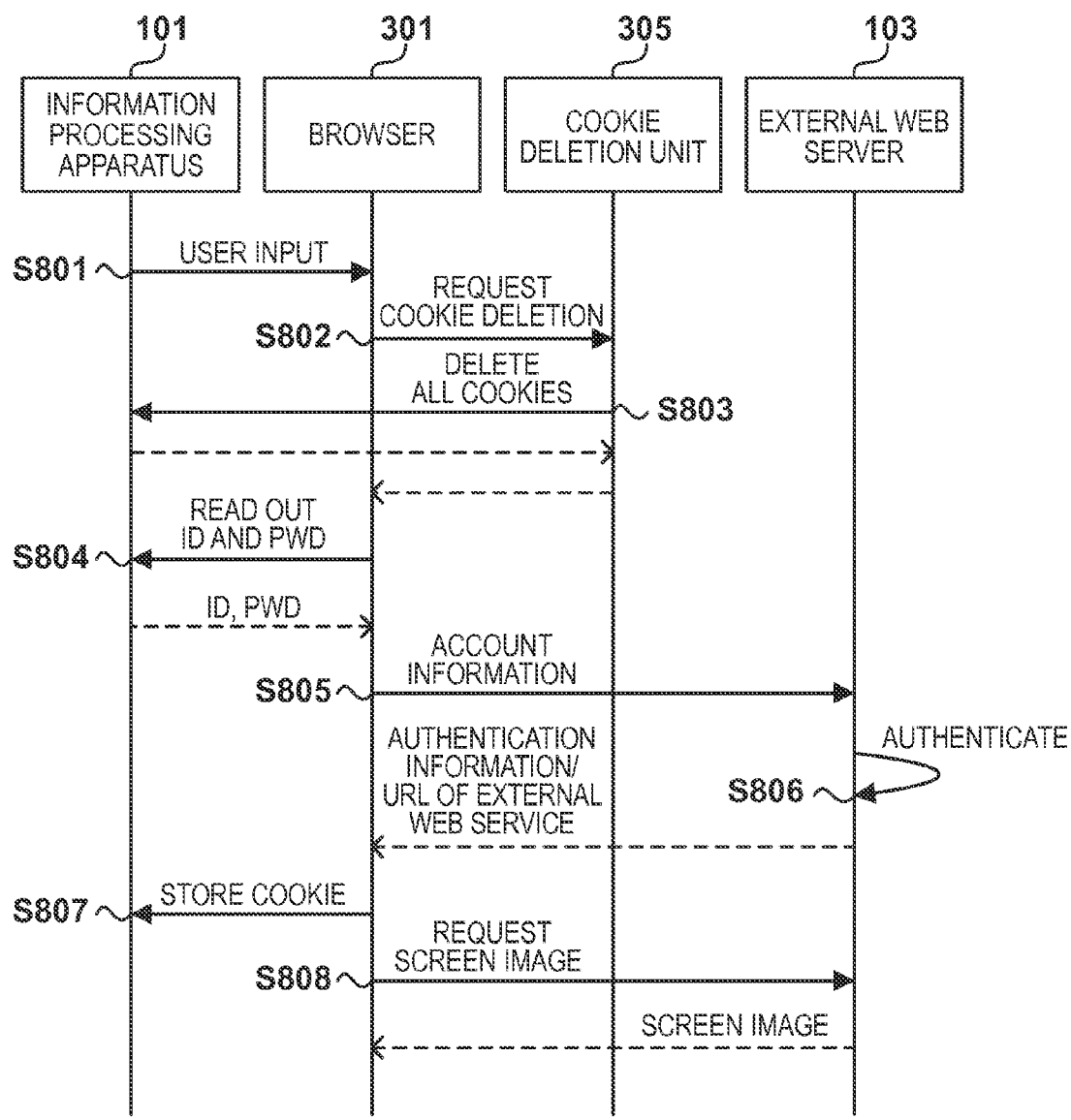
FIG. 8 is a sequence chart showing the procedure of logout processing according to the first embodiment.

In this embodiment, when the operation of the user is completed, logout of the target web service is performed from the target web service by logout processing (step S404). Note that logout here indicates deletion of a stored Cookie. FIG. 8 is a sequence chart showing the procedure of logout processing (step S404).

In logout processing (step S404), the browser 301 receives user's selection of the indicator 508 used to instruct logout of the target web service, and receives the logout request (step S801). The Java Script processing unit 302 requests the Cookie deletion unit 305 to delete Cookies (step S802). The Cookie deletion unit 305 deletes all Cookies (authentication information) stored in the Cookie storage area 307 (step S803). After that, the browser 301 causes the login unit 304 to read out the account information of the external web service from the account information storage area 308 (step S804), and POSTs the readout account information in the URL of the external web service (step S805). The external web server 103 performs authentication using the received account information (step S806), and returns the URL of the external web service with a Cookie. The browser 301 causes the Cookie write unit 303 to store the received Cookie in the Cookie storage area 307 (step S807), accesses the received URL of the web page, and displays the received web page 501 (step S808).

As described above, in this embodiment, the web browser is caused to display, together with a web page, an indicator to receive an operation of instructing deletion of authentication information. Upon receiving the instruction by the indicator, authentication information stored in the storage area is deleted. This makes it possible to easily delete a Cookie even when the logout function is not prepared by the external web service, or the user has no skill in browser operation.

In addition, the external web server 103 provides the web page 507 including the indicator 508 to do a logout request. In accordance with a user instruction to the indicator 508, a Cookie including the authentication information of the target web server 104 is deleted. For example, in some cases, a plurality of pieces of authentication information corresponding to a plurality of target web services are stored as Cookies. In this case, the plurality of pieces of authentication information can be deleted at once by sending an instruction to the external web server without instructing logout for each of a plurality of web pages corresponding to the plurality of target web services.

Even when the user instructs to delete Cookies, re-login to the external web service is automatically performed by the processes of steps S804 to S808. For this reason, when a Cookie is deleted, and an account and password necessary to log in to the external web service are deleted, the user can automatically log in to the external web service without inputting these pieces of information again.

At the time of re-login, the web page 507 in which the user has input a logout instruction may be accessed after re-login. For example, even when a web page displayed when logging in to the external web service is normally different from the web page 507, the web page 507 is displayed at the time of re-login. To do this, the external web server 103 returns a URL corresponding to the web page 507 in step S806, and requests a screen image using the URL corresponding to the web page 507 in step S808. Since the web page 507 is displayed before and after the logout instruction of the user, the web page to be displayed can be prevented from changing in logout and re-login against the user's intension.

<<Second Embodiment>>

In the first embodiment, a case has been described where after deleting Cookies of an external web service and services other than it at the time of logout, re-login to the external web service is performed again. In the second embodiment, a method of deleting Cookie information of services other than the external web service will be described. Note that the system arrangement, the arrangement of an information processing apparatus, the external web service use procedure, the screen images of the external web service use procedure, the procedure of browser activation processing, and the procedure of login processing to a target web service according to the second embodiment are the same as in the first embodiment, and a description thereof will be omitted.

Figure 9:
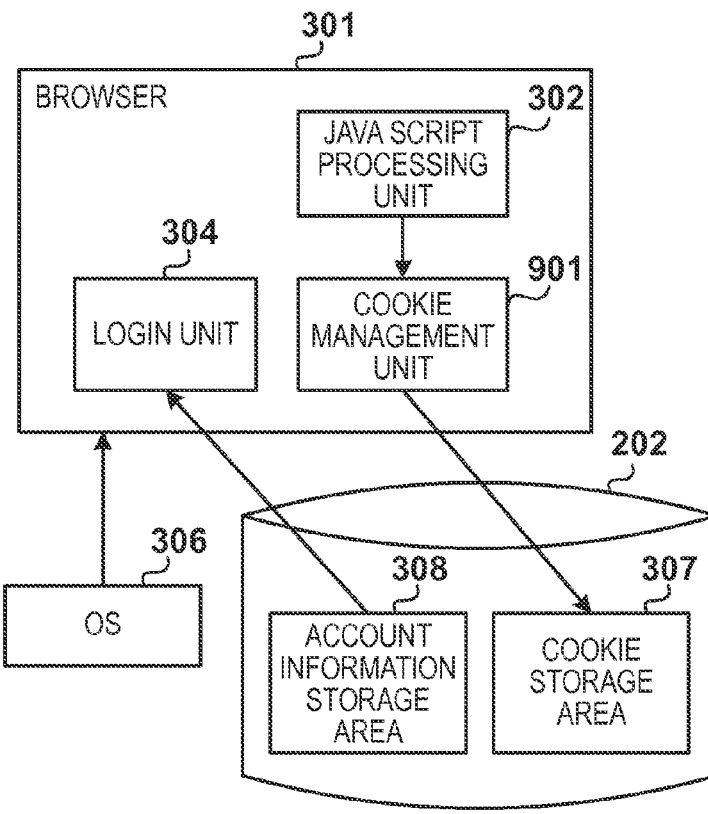
FIG. 9 is a block diagram showing an example of the software configuration of an information processing apparatus according to the second embodiment.

FIG. 9 is a block diagram showing a software configuration according to this embodiment. A browser 301, a Java Script processing unit 302, a login unit 304, an OS 306, a RAM 202, a Cookie storage area 307, and an account information storage area 308 are the same as in the first embodiment, and a description thereof will be omitted.

A Cookie management unit 901 writes the domain name of a web page that is being displayed and a received Cookie in the Cookie storage area 307. The Cookie management unit 901 also deletes Cookies stored in the Cookie storage area 307 other than a Cookie of the domain of the web page that is being displayed.

Figure 10:
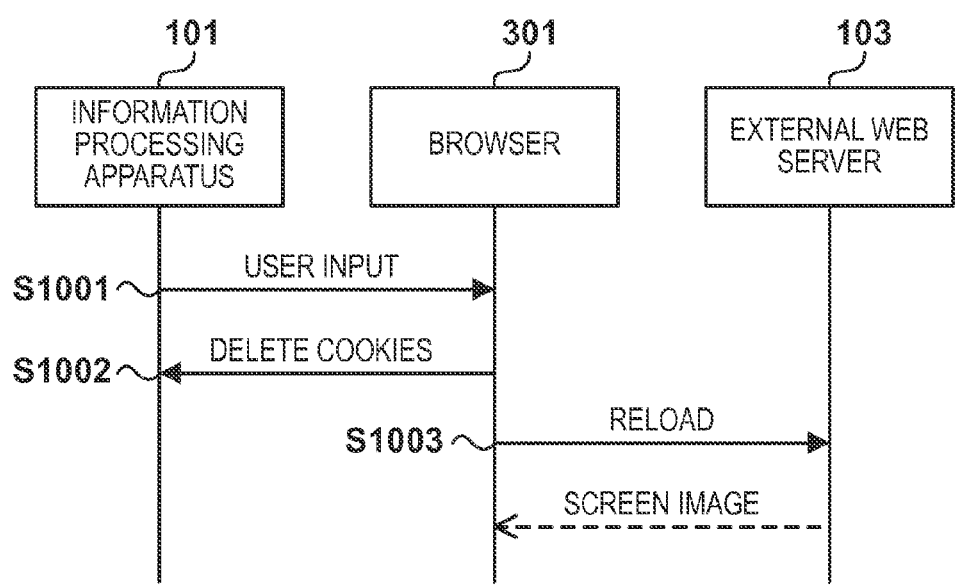
FIG. 10 is a sequence chart showing the procedure of logout processing according to the second embodiment.

FIG. 10 is a sequence chart showing the procedure of logout processing according to this embodiment. The browser 301 receives user's selection of an indicator 508 used to instruct logout of a target web service, and receives a logout request (step S1001). The Java Script processing unit 302 requests the Cookie management unit 901 to delete Cookies (step S1002). The Cookie management unit 901 searches the Cookies stored in the Cookie storage area 307 for the Cookie of the external web page that is being displayed using the domain name as a key, and deletes all Cookies other than it. After that, the browser 301 requests the web page from an external web server 103 again (step S1003) and displays a received web page 501.

As described above, in this embodiment, the Cookie management unit 901 deletes Cookies stored in the Cookie storage area 307 other than a Cookie of the domain of a web page that is being displayed. This makes it possible to log out from the target web service while holding the login state of the external web service.

Note that in the above-described first and second embodiments, a case where there exists one target web service that needs login and is to be used by the external web service has been explained. However, the processing can similarly be executed even when a plurality of target web services exist. That is, all Cookies or Cookies other than that of a web page that is being displayed are deleted by executing logout processing, as described above. For this reason, even when the user has logged in to a plurality of target web services, it is possible to delete authentication information for all the target web services.

In the above-described first and second embodiments, a case where as for login of an external web service, the login unit 304 executes automatic login using account information stored in the account information storage area 308 has been explained. However, instead of performing automatic login, an authentication screen image may be displayed, and manual account information input by the user may be received to execute login processing.

In the above-described first and second embodiments, login using account information registered in advance is necessary to use an external web service. However, the advanced registration and account information may be unnecessary. In the first and second embodiments, an operation of Java Script has been exemplified as processing of instructing the Cookie deletion unit. However, any other script or programming language such as Flash, Silvelight, or HTML5 may be used to execute this processing. In the above description, Cookies are deleted by the browser 301. However, the deletion may be done by plugin software.

In the above-described first and second embodiments, all Cookies other than that of a web page that is being displayed (for example, the domain of a web page that is being displayed) are deleted. However, the present invention is not limited to this. For example, all pieces of authentication information other than that about the information processing apparatus 101 may be deleted. That is, authentication information of the information processing apparatus 101 is the result of authenticating the information processing apparatus 101 itself. The authentication result may be made usable independently of the user, and only other authentication information of, for example, users may be deleted. As for another deletion method, after all Cookies are temporarily deleted, as in the first embodiment, authentication processing for the information processing apparatus 101 may wholly be re-executed. As in the second embodiment, authentication information of the information processing apparatus 101 may be identified, and all the remaining pieces of authentication information other than it may be deleted. Instead of leaving authentication information of the information processing apparatus 101, pieces of authentication information of users may be selected and deleted. Since pieces of authentication information of users are deleted by these methods, a user can be prevented from using a target web service based on the authentication information of another user.

As described above, in this embodiment, the user can input an instruction for Cookie deletion in a web page provided by the external web service (external web server 103). Hence, for example, when the user deletes Cookies after inputting an instruction for a web page provided by an external web service or target web service and using various kinds of services, the Cookies can be deleted in accordance with the same instruction as that for the web page. This makes it possible to easily delete a Cookie as compared a case where, for example, Cookie deletion is instructed in menu display provided by a web browser.

When instructing Cookie deletion in menu display provided by the web browser, the display screen image provided by the web browser needs to have a display area for menu display separately from that for a web page, or the menu display needs to be superimposed on the web page. For this reason, when the menu display is done on a device such as a printing apparatus or smartphone having a relatively small display, it is difficult for the user to visually recognize the menu display.

On the other hand, according to this embodiment, a web page provides a user interface to input a Cookie deletion instruction. Hence, a display item (for example, button) for Cookie deletion need not be displayed on or separately from the web page, and the user can easily recognize the display item.

When instructing Cookie deletion in menu display provided by the web browser installed in the information processing apparatus 101, the web browser needs to be reinstalled to update the user interface. On the other hand, in this embodiment, since the user interface for Cookie deletion is provided as a web page, for example, a web service provider can change and update the user interface by changing the contents of the web page. It is therefore possible to easily change the user interface.

When deleting Cookies in the menu display of the web browser, a user who has no administrative right of the OS may be unable to delete the Cookies. On the other hand, according to this embodiment, since an instruction for Cookie deletion is input on a web page, and Cookie deletion is done by plugin software, the user can delete Cookies regardless of the administrative right.

Note that in the above embodiments, an example has been described in which when the user inputs a deletion instruction, all pieces of authentication information corresponding to one or a plurality of target web services are deleted from Cookies. However, the present invention is not limited to this. For a specific target web service, control may be done to prohibit deletion of authentication information from Cookies. The specific target web service may be predetermined by the information processing apparatus 101 or designated by the user so as to exclude the authentication information from the target to be deleted from Cookies.

Note that deletion processing according to the above-described embodiments can be either processing of overwriting predetermined data on deletion target data in the memory or processing of controlling not to access the data defined as deletion target data. In the latter case, when writing another data in the memory, the other data is overwritten on the deletion target data.

In the above-described embodiments, the Cookie storage area 307 and the account information storage area 308 are allocated in the RAM 202. However, the present invention is not limited to this, and a Cookie and account information for an external web service may respectively be stored in two memories serving as two different storage areas.

When implementing the functions of the embodiments by program codes, the program codes may be executed by one computer (CPU or MPU) or by cooperation of a plurality of computers. The program codes may be executed by a computer, or hardware such as a circuit for implementing the functions of the program codes may be provided. Some of the program codes may be implemented by hardware, and the remaining may be executed by a computer.

According to the present invention, it is possible to easily delete stored authentication information.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-167849 filed on Aug. 12, 2013, which is hereby incorporated by reference herein in its entirety.

What is claimed is:

1. An information processing apparatus comprising:
   a memory configured to store at least one program; and
   at least one processor configured to execute the at least one program stored in the memory;
   wherein the at least one processor, in executing the at least one program, executes:
   storing first authentication information corresponding to a first web service and second authentication information corresponding to a second web service different from the first web service, in a first storage area;
   causing a display unit displaying a web page corresponding to the first web service to display an indicator to receive a predetermined instruction;
   executing, in the first storage area, upon receiving the predetermined instruction by the indicator displayed by the display unit, deletion processing of both of the first authentication information and the second authentication information; and
   executing authentication processing for the first web service using the first authentication information stored in a second storage area different from the first storage area, in a case where the deletion processing is executed in accordance with the predetermined instruction.

2. The apparatus according to claim 1, wherein after the authentication processing, the at least one processor stores authentication information of the authentication processing, in the first storage area.

3. The apparatus according to claim 2, wherein the at least one processor acquires the first authentication information and the second authentication information, from one or more servers corresponding to the first web service and the second web service,
   wherein the at least one processor stores the acquired first authentication information and the acquired second authentication information, in the first storage area, and
   wherein, after the authentication processing, the at least one processor acquires the authentication information corresponding to the first web service from the server corresponding to the first web service, and stores the acquired authentication information, in the first storage area.

4. The apparatus according to claim 1, wherein the at least one processor executes authentication processing for the web page that is being displayed on the display unit upon receiving the predetermined instruction.

5. The apparatus according to claim 1, wherein in a case where the first authentication information and the second authentication information are stored, the at least one processor deletes the second authentication information stored in the first storage area except the first authentication information.

6. The apparatus according to claim 1, wherein the at least one processor deletes the authentication information stored in the first storage area except authentication information of the information processing apparatus.

7. The apparatus according to claim 1, wherein the at least one processor deletes the first authentication information and the second authentication information, each of which corresponds to a user of the information processing apparatus and is stored in the first storage area.

8. The apparatus according to claim 1, wherein the at least one processor acquires the first authentication information and the second authentication information, from one or more servers corresponding to the first web service and the second web service, and
the at least one processor stores the acquired first authentication information and the acquired second authentication information, in the first storage area.

9. The apparatus according to claim 1, wherein the at least one processor deletes all authentication information stored in the first storage area.

10. The apparatus according to claim 1, wherein the information processing apparatus is a multifunction peripheral.

11. The apparatus according to claim 1, wherein the at least one processor causes the display unit to display the indicator in the web page, via a web browser.

12. The apparatus according to claim 11, wherein the at least one processor executes the deletion processing, by executing a plug-in software, stored in the memory, for the web browser.

13. The apparatus according to claim 1, wherein the at least one processor stores the first authentication information and the second authentication information as a Cookie, in the first storage area as a Cookie storage area.

14. An information processing method of processing authentication information corresponding to a web service, the method comprising:
storing first authentication information corresponding to a first web service and second authentication information corresponding to a second web service different from the first web service, in a first storage area;
causing a display unit displaying a web page corresponding to the first web service to display an indicator to receive a predetermined instruction;
upon receiving the predetermined instruction by the indicator displayed by the display unit, executing, in the first storage area, deletion processing of both of the first authentication information and the second authentication information; and
executing authentication processing for the first web service using the first authentication information stored in a second storage area different from the first storage area, in a case where the deletion processing is executed in accordance with the predetermined instruction.

15. The method according to claim 14, further comprising acquiring the first authentication information and the second authentication information, from one or more servers corresponding to the first web service and the second web service,
wherein the acquired first authentication information and the acquired second authentication information are stored in the first storage area.

16. The method according to claim 14, further comprising storing, after the authentication processing, authentication information of the authentication processing, in the first storage area.

17. The method according to claim 16, further comprising acquiring the first authentication information and the second authentication information, from one or more servers corresponding to the first web service and the second web service,
wherein the acquired first authentication information and the acquired second authentication information, is stored in the first storage area, and
wherein, after the authentication processing, the authentication information corresponding to the first web service is acquired from the server corresponding to the first web service, and is stored in the first storage area.

18. The method according to claim 14, wherein authentication processing for the web page that is being displayed on the display unit is executed upon receiving the predetermined instruction.

19. The method according to claim 14, wherein by the deletion processing, all authentication information stored in the first storage area is deleted.

20. The method according to claim 14, wherein by the deletion processing, the first authentication information and the second authentication information, each of which corresponds to a user of the information processing apparatus and is stored in the first storage area, is deleted.

21. The method according to claim 14, wherein the display unit is caused to display the indicator in the web page, via a web browser.

22. The method according to claim 21, wherein the deletion processing is executed, by executing a plug-in software for the web browser.

23. The method according to claim 14, wherein the first authentication information and the second authentication information as a Cookie, is stored in the first storage area as a Cookie storage area.

24. A non-transitory computer-readable storage medium storing a computer program that causes a computer to execute an information processing method of processing authentication information corresponding to a web service, the program comprising:
code for storing first authentication information corresponding to a first web service and second authentication information corresponding to a second web service different from the first web service, in a first storage area;
code for causing a display unit displaying a web page corresponding to the first web service to display an indicator to receive a predetermined instruction;
code for, upon receiving the predetermined instruction by the indicator displayed by the display unit, executing, in the first storage area, deletion processing of both of the first authentication information and the second authentication information; and code for executing authentication processing for the first web service using the first authentication information stored in a second storage area different from the first storage area, in a case where the deletion processing is executed in accordance with the predetermined instruction.

\* \* \* \* \*